US006430904B1

(12) United States Patent
Coers et al.

(10) Patent No.: US 6,430,904 B1
(45) Date of Patent: Aug. 13, 2002

(54) PLATFORM AUGER TORQUE SENSING BRAKE ACTIVATION

(75) Inventors: Bruce Alan Coers, Hillsdale; Roderick James Jensen, Moline; Mark Michael Chaney, Orion, all of IL (US)

(73) Assignee: Deere & Company, Moline, IL (US)

(*) Notice: Subject to any disclaimer, the term of this patent is extended or adjusted under 35 U.S.C. 154(b) by 0 days.

(21) Appl. No.: 09/851,828

(22) Filed: May 9, 2001

(51) Int. Cl.[7] ............................................... A01D 34/76
(52) U.S. Cl. ................... 56/10.3; 56/10.2 R; 56/10.2 A
(58) Field of Search ...................... 56/10.2 R, 10.2 A, 56/10.2 G, 10.2 H, 10.5, 12.4, 12.5, 14.5, 364, DIG. 15; 198/513, 518, 613, 693, 722, 723; 701/50, 207

(56) References Cited

U.S. PATENT DOCUMENTS

| 4,893,241 | A | * | 1/1990 | Girodat et al. ................. 701/50 |
| 5,355,199 | A | * | 10/1994 | Bray ........................... 355/245 |
| 5,620,083 | A | | 4/1997 | Vogelgesang ............... 198/513 |
| 6,192,644 | B1 | * | 2/2001 | Missotten et al. ........ 56/10.2 R |

OTHER PUBLICATIONS

Deere & Company Manual entitled "Combine Harvesting", FMO–15102B, pp. 25–30, 141–144, published in the U.S.A.—1973.

Deere & Company Operator's Manual entitled "200 Series Cutting Platforms", OM–H124055 Issue A7, pp. 52–56, published in the U.S.A.—1987.

* cited by examiner

Primary Examiner—Robert E. Pezzuto

(57) ABSTRACT

A harvesting assembly is provided with a transverse feed auger for directing harvested crop material into a feederhouse. The feed auger is also provided with retractable fingers. The retractable fingers are freely rotatably mounted on a finger timing shaft located in the feed auger. A feed auger torque sensor is mounted to the feed auger and communicates an actual feed auger torque signal to a controller. The controller is provided with a memory having a maximum desired feed auger torque signal. When the actual feed auger torque signal exceeds the maximum desired feed auger torque signal, the feed auger drive is disengaged. A timing shaft torque sensor is mounted to the finger timing shaft and communicates an actual timing shaft torque signal to the controller. The memory of the controller is provided with a maximum desired timing shaft torque signal. When the actual timing shaft torque signal exceeds the maximum desired timing shaft torque signal a brake is applied to the feed auger.

19 Claims, 2 Drawing Sheets

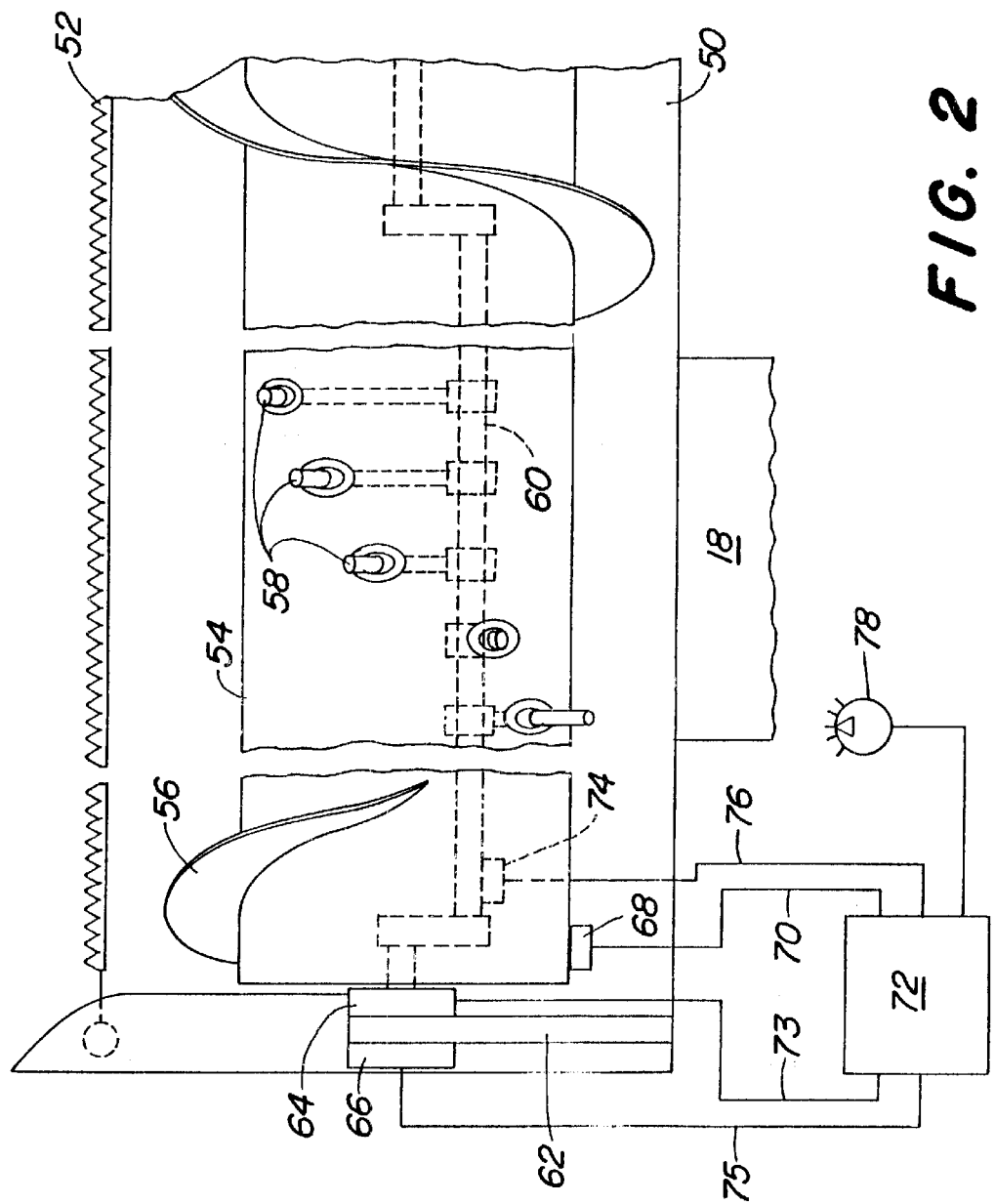

PLATFORM AUGER TORQUE SENSING BRAKE ACTIVATION

BACKGROUND OF THE INVENTION

1. Field of the Invention

The present invention is directed to a drive system for a harvesting assembly wherein torque sensors signal a controller to disengage and/or brake the rotation of the feed auger.

2. Description of the Prior Art

Agricultural combines are large machines that harvest, thresh, separate and clean an agricultural crop. The resulting clean grain is stored in a grain tank located on the combine. The clean grain can then be transported from the grain tank to a truck, grain cart or other receiving bin by an unloading auger.

A harvesting assembly located at the front of the combine harvests the crop. The harvesting assembly may comprise a harvesting platform or a pickup platform. A harvesting platform has a mower assembly for cutting the standing crop. The cut crop falls onto the platform and is taken up by a feed auger that directs the harvested crop to the feederhouse of a combine. A pickup platform is provided with a pickup assembly for picking up a cut crop lying in a field. The cut crop is directed to a feed auger that directs the harvested crop to the feederhouse. The feed augers on both the harvesting platform and the pickup platform are provided with finger timing shafts. The finger timing shafts are located in the feed augers. Each finger timing shaft is provided with a series of retractable fingers that extend from and retract into the feed auger. The retractable fingers are used to throw the crop into the feederhouse.

The drives for the feed auger are typically provided with a slip clutch to prevent or at least reduce the damage to the auger and the surrounding components caused by an excessive load of harvested crop material. These clutches have been found to be inconsistent and slip at undesirable levels. They do not prevent damage to the retractable fingers.

SUMMARY

It is an object of the present invention to provide a system for protecting the feed auger and retractable fingers located therin from excessive loads of harvested crop material.

A harvesting assembly comprises a frame having a transverse feed auger for directing harvested crop material into a feederhouse. The feed auger is rotatably driven relative to the frame by a feed auger drive. The feed auger is also provided with freely rotatable retractable fingers mounted on a finger timing shaft located in the feed auger.

A feed auger torque sensor is mounted to the feed auger and a timing shaft torque sensor is mounted to the finger timing shaft. The feed auger torque sensor provides an actual feed auger torque signal. The timing shaft torque sensor provides an actual timing shaft torque signal. Both actual torque signals are communicated to an electronic controller. The controller is provided with a memory storing a maximum desired feed auger torque signal and a maximum desired finger timing shaft torque signal. The controller compares the actual feed auger torque signal with the maximum desired feed auger torque signal. If the actual feed auger torque signal exceeds the desired feed auger torque signal the feed auger drive is disengaged. The controller also compares the actual timing shaft torque signal with the maximum desired timing shaft torque signal. If the actual timing shaft torque signal exceeds the maximum desired timing shaft torque signal the feed auger drive is declutched and a brake is applied to the feed auger.

The maximum desired torque signals can be selected by an operator through an operator input located in the operator's cab of the combine.

BRIEF DESCRIPTION OF THE DRAWINGS

FIG. 2 is a schematic of the feed auger drive system of the present invention.

DETAILED DESCRIPTION

Figure 1:
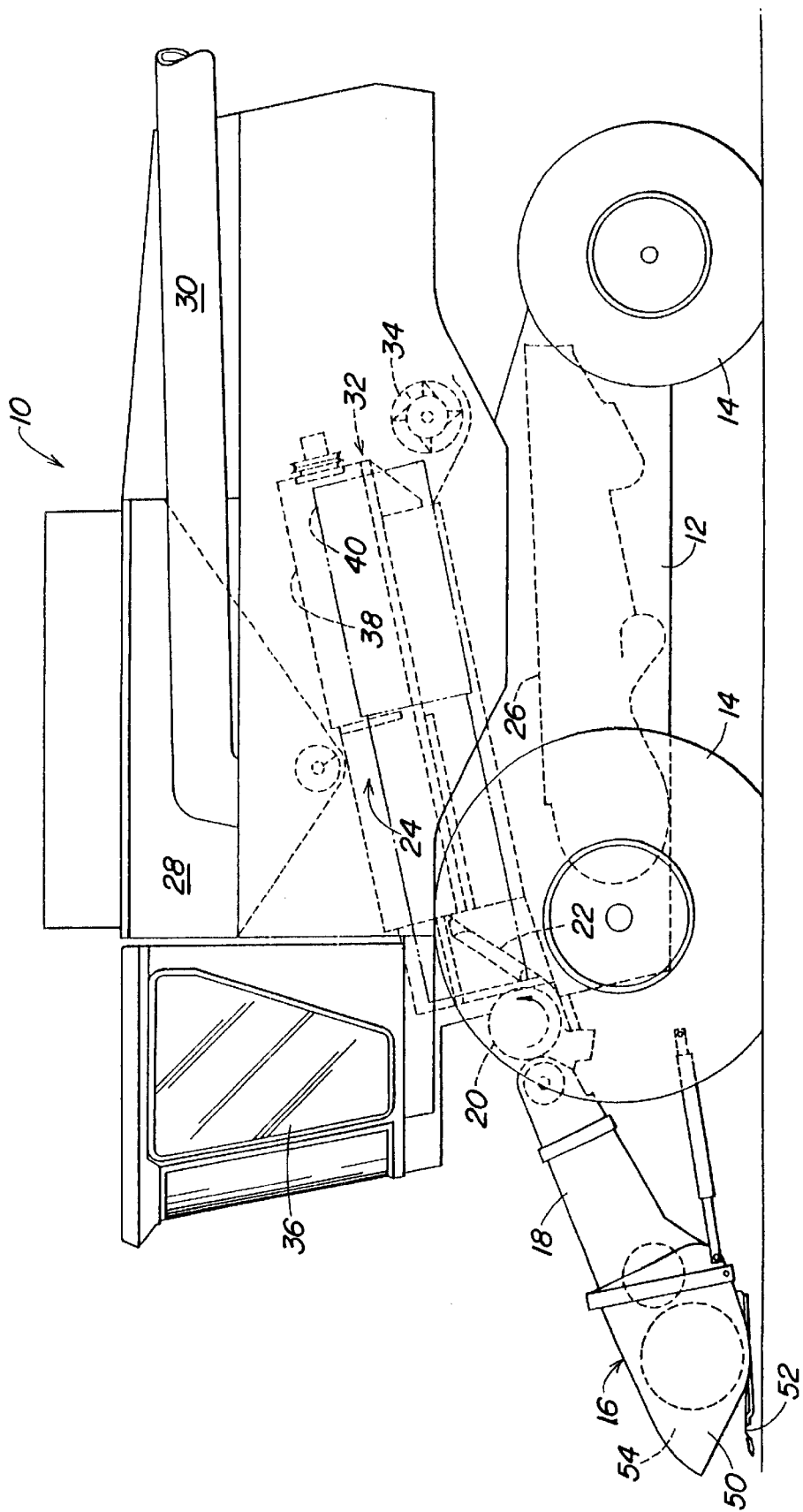
FIG. 1 is a semi-schematic side view of an agricultural combine.

FIG. 1 shows an agricultural combine 10 comprising a supporting structure 12 having ground engaging wheels 14 extending from the supporting structure. Although the combine is illustrated as having wheels it could also have ground engaging tracks, either full tracks or half tracks. A harvesting assembly 16 is used for harvesting a crop and directing it to a feederhouse 18. The feederhouse 18 contains a conveyor for conveying the harvested crop to a beater 20. The beater 20 directs the crop upwardly through an inlet transition section 22 to a rotary threshing and separating assembly 24. The illustrated threshing and separating assembly 24 is axially arranged in the combine 10, however, it could be in other orientations relative to the longitudinal axis of the combine. Although the present invention is described and illustrated as being used on a rotary threshing and separating assembly, it can also be used on a combine having a conventional transverse threshing cylinder and concave assembly.

The rotary threshing and separating assembly 24 threshes and separates the harvested crop material. Grain and chaff fall through grates on the bottom of the threshing and separating assembly 24 to a cleaning system 26. The cleaning system 26 removes the chaff and directs the clean grain to a clean grain elevator (not shown). The clean grain elevator deposits the clean grain in grain tank 28. The clean grain in the tank can be unloaded into a grain cart or truck by unloading auger 30.

Threshed and separated straw is discharged from the rotary threshing and separating assembly 24 through outlet 32 to discharge beater 34. The discharge beater in turn propels the straw out the rear of the combine. It should be noted that the discharge beater 34 could also discharge crop material other than grain directly to a straw chopper. The operation of the combine is controlled from operator's cab 36.

The rotary threshing and separating assembly 24 comprises a cylindrical rotor housing 38 and a rotor 40 located inside the housing 36. The front part of the rotor and the rotor housing define an infeed section. Downstream from the infeed section are a threshing section, a separating section and a discharge section. The rotor 40 in the infeed section is provided with a rotor drum having helical infeed elements for engaging harvested crop material received from the beater 20 and inlet transition section 22. Immediately downstream from the infeed section is the threshing section. In the threshing section the rotor 40 comprises a cylindrical rotor drum having a number of threshing elements for threshing the harvested crop material received from the infeed section. Downstream from the threshing section is the separating section wherein the grain trapped in the threshed crop material is released and falls through a floor grate in the rotor housing 38 to the cleaning system 26. The separating section merges into a discharge section where crop material other than grain is expelled from the rotary threshing and separating assembly 24.

The harvesting assembly 16 illustrated in FIG. 1 is a harvesting platform having a frame 50, a mowing assembly 52 and a gathering reel, not shown. The gathering reel gathers the standing crop against the mowing assembly 52 which cuts the crop and lets it fall onto the floor of the frame 50. The cut crop is pushed rearwardly along the floor and is directed to the transverse feed auger 54. The feed auger 54 is provided with helical flights 56 for driving the cut crop into the center of the frame 50 from which it is directed into the feederhouse 18.

The feed auger 54 is provided with retractable fingers 58. The retractable fingers 58 are freely rotatably mounted to a finger timing shaft 60 located inside the feed auger 54. The finger timing shaft 60 is eccentrically mounted in the feed auger so that the fingers extend from and retract into the feed auger 54 as it is rotated. The feed auger 54 is driven by a feed auger drive 62. Typically, the feed auger drive 62 is a belt drive, however it could also be a chain drive, a hydraulic motor or an electric motor. This drive can be disengaged from the feed auger 54 by a clutch 64. In addition, the feed auger 54 is also provided with a brake 66 for stopping the rotational movement of the feed auger relative to the frame 50.

The feed auger 54 is provided with a feed auger torque sensor 68 that provides an actual feed auger torque signal in response to torque being applied to the feed auger. The torque sensor 68 can be of any configuration, for example strain gauges measuring the torque induced distortion in the feed auger. The feed auger torque sensor 68 is in electronic communication through line 70 with a controller 72 comprising an electronic controller having a memory. The memory of the controller 72 is provided with a maximum desired feed auger torque signal. The controller 72 compares the actual feed auger torque signal to the maximum desired feed auger torque signal. If the actual feed auger torque signal exceeds the maximum desired feed auger torque signal, the controller 72 signals the clutch 64 through line 73 to disengage (declutch) the feed auger drive 62 from the feed auger 54. The operator can then remove the slug of crop material jamming the feed auger 54. The brake 66 is not necessary to brake the feed auger 54 as the crop material load on the feed auger will provide suitable braking force.

The finger timing shaft 60 is provided with a timing shaft torque sensor 74 that provides an actual timing shaft torque signal in response to torque being applied to the finger timing shaft 60 by the retractable fingers 58. The torque sensor can be of any configuration, for example strain gauges measuring the torque induced distortion in the finger timing shaft. The timing shaft sensor 68 is in electronic communication through line 76 with the controller 72. The memory of the controller 72 is provided with a maximum desired timing shaft torque signal. The controller 72 compares the actual timing shaft torque signal to the maximum desired timing shaft torque signal. If the actual timing shaft torque signal exceeds the maximum desired timing shaft torque signal, the controller 72 signals the brake 66 through line 75 to brake to rotation of the feed auger 56. The brake is necessary to prevent damage to the retractable fingers as the rotating feed auger will have sufficient momentum to break the fingers.

Different harvesting conditions may require different maximum desired feed auger torque signal and maximum desired timing shaft torque signal. To that end an operator input 78 is located in the operator's cab 36. The operator input 78 may comprise a simple rotary switch, a key board or other device for inputting the maximum desired torque signals into the memory of the controller 72 through line 80.

The present invention should not be limited by the above-described embodiments, but should be limited solely by the claims that follow.

We claim:

1. A harvesting assembly comprising:
    a frame;
    a feed auger rotatably mounted to the frame;
    a feed auger drive for rotating the feed auger relative to the frame;
    a feed auger torque sensor for torque transmitted to the feed auger and providing an actual feed auger torque signal;
    a controller having a memory in which a maximum desired feed auger torque signal is stored, the controller disengages the feed auger drive from driving the feed auger when the actual feed auger torque signal exceeds the maximum desired feed auger torque signal.

2. A harvesting assembly as defined by claim 1 further comprising an operator control that is in communication with the controller for setting the maximum desired feed auger torque signal.

3. A harvesting assembly as defined by claim 2 wherein the feed auger is provided with retractable fingers that are mounted on a finger timing shaft.

4. A harvesting assembly as defined by claim 3 wherein the finger timing shaft is provided with a timing shaft torque sensor for torque transmitted to the finger timing shaft and providing an actual timing shaft torque signal.

5. A harvesting assembly as defined by claim 4 wherein the feed auger is provided with a brake, the brake is engaged by the controller whenever the actual timing shaft torque signal exceeds a maximum desired timing shaft torque signal stored in the memory of the controller.

6. A harvesting assembly as defined by claim 5 wherein the feed auger is a hollow tube in which is located the finger timing shaft.

7. A harvesting assembly as defined by claim 1 wherein feed auger is provided with retractable fingers that are mounted on a finger timing shaft.

8. A harvesting assembly as defined by claim 7 wherein the finger timing shaft is provided with a timing shaft torque sensor for torque transmitted to the finger timing shaft and providing an actual timing shaft torque signal.

9. A harvesting assembly as defined by claim 8 wherein the feed auger is provided with a brake, the brake is engaged by the controller whenever the actual timing shaft torque signal exceeds a maximum desired timing shaft torque stored in the memory of the controller.

10. A method of controlling how much torque is applied to a feed auger of a harvesting assembly, the feed auger is rotated by a feed auger drive, the method comprising:
    sensing the torque applied to the feed auger and forming an actual feed auger torque signal;
    communicating the actual feed auger torque signal to a controller having a memory;
    comparing the actual feed auger torque signal to a maximum desired feed auger torque signal stored in the memory of the controller;
    disengaging the feed auger drive when the actual feed auger torque signal exceeds the maximum desired feed auger torque signal.

11. A method as defined by claim 10 including the additional step of sensing the torque applied to a finger timing shaft located in the feed auger and forming an actual timing shaft torque signal.

12. A method as defined by claim 11 including the additional step of communicating the actual timing shaft torque signal to the controller.

13. A method as defined by claim 12 comprising the additional step of comparing the actual timing shaft torque signal to a maximum desired timing shaft torque signal stored in the memory of the controller.

14. A method as defined by claim 13 comprising the additional step of braking the feed auger when the actual timing shaft torque signal exceeds the maximum desired timing shaft torque signal.

15. A method as defined by claim 13 comprising the additional step of inputting the maximum desired feed auger torque signal and the maximum desired timing shaft torque signal to the controller.

16. A harvesting assembly comprising:
   a frame;
   a feed auger rotatably mounted to the frame, the feed auger being provided with retractable fingers that are freely rotatably mounted to a finger timing shaft;
   a feed auger drive for rotating the feed auger relative to the frame;
   a brake for braking the rotation of the feed auger;
   a timing shaft torque sensor for sensing torque transmitted to the finger timing shaft and providing an actual timing shaft torque signal;
   a controller having a memory in which a maximum desired timing shaft torque signal is stored, the controller activates the brake braking the feed auger when the actual timing shaft torque signal exceeds the maximum desired timing shaft torque signal.

17. A harvesting assembly as defined by claim 16 further comprising an operator control that is in communication with the controller for setting the maximum desired timing shaft torque signal.

18. A method of controlling how much torque is applied to a feed auger of a harvesting assembly, the feed auger is rotated by a feed auger drive and is provided with retractable fingers freely rotatably mounted on a finger timing shaft, the method comprising:
   sensing the torque applied to the finger timing shaft and forming an actual timing shaft torque signal;
   communicating the actual timing shaft torque signal to a controller having a memory;
   comparing the actual timing shaft torque signal to a maximum desired timing shaft torque signal stored in the memory of the controller;
   braking the feed auger drive when the actual timing shaft torque signal exceeds the maximum desired timing shaft torque signal.

19. A method as defined by claim 18 comprising the additional step of inputting the maximum desired timing shaft torque signal to the controller.

* * * * *